Jan. 10, 1950     W. R. BROWN ET AL     2,493,749
SECTIONAL HOSPITAL TENT
Filed Aug. 11, 1945                       8 Sheets-Sheet 2
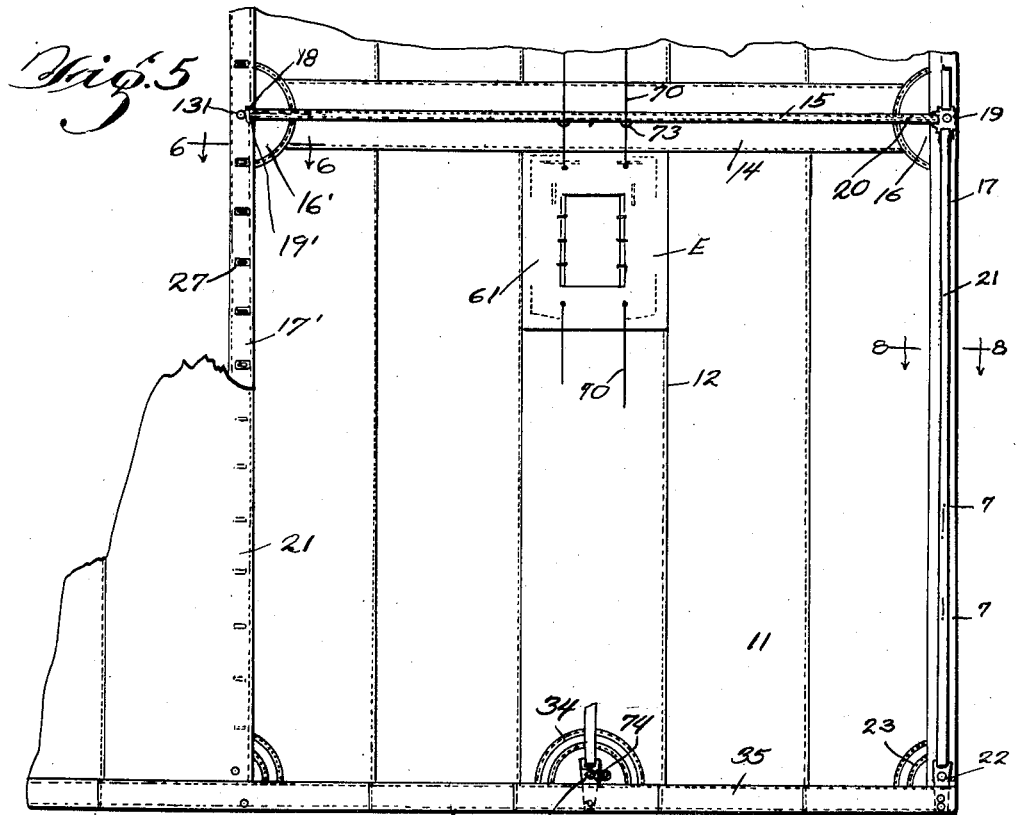
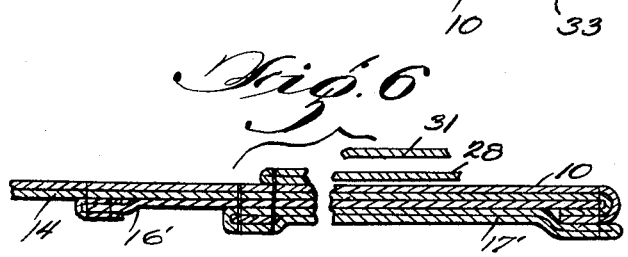
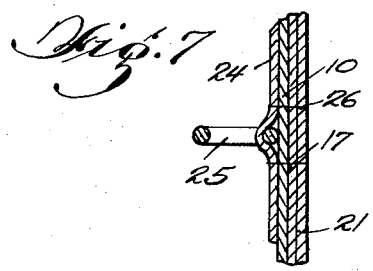
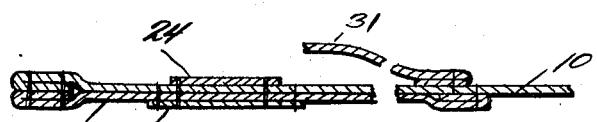
INVENTORS
Walter R. Brown,
John W. Cull and
BY Roy E. Lushbaugh
William F. Dennond
ATTORNEY

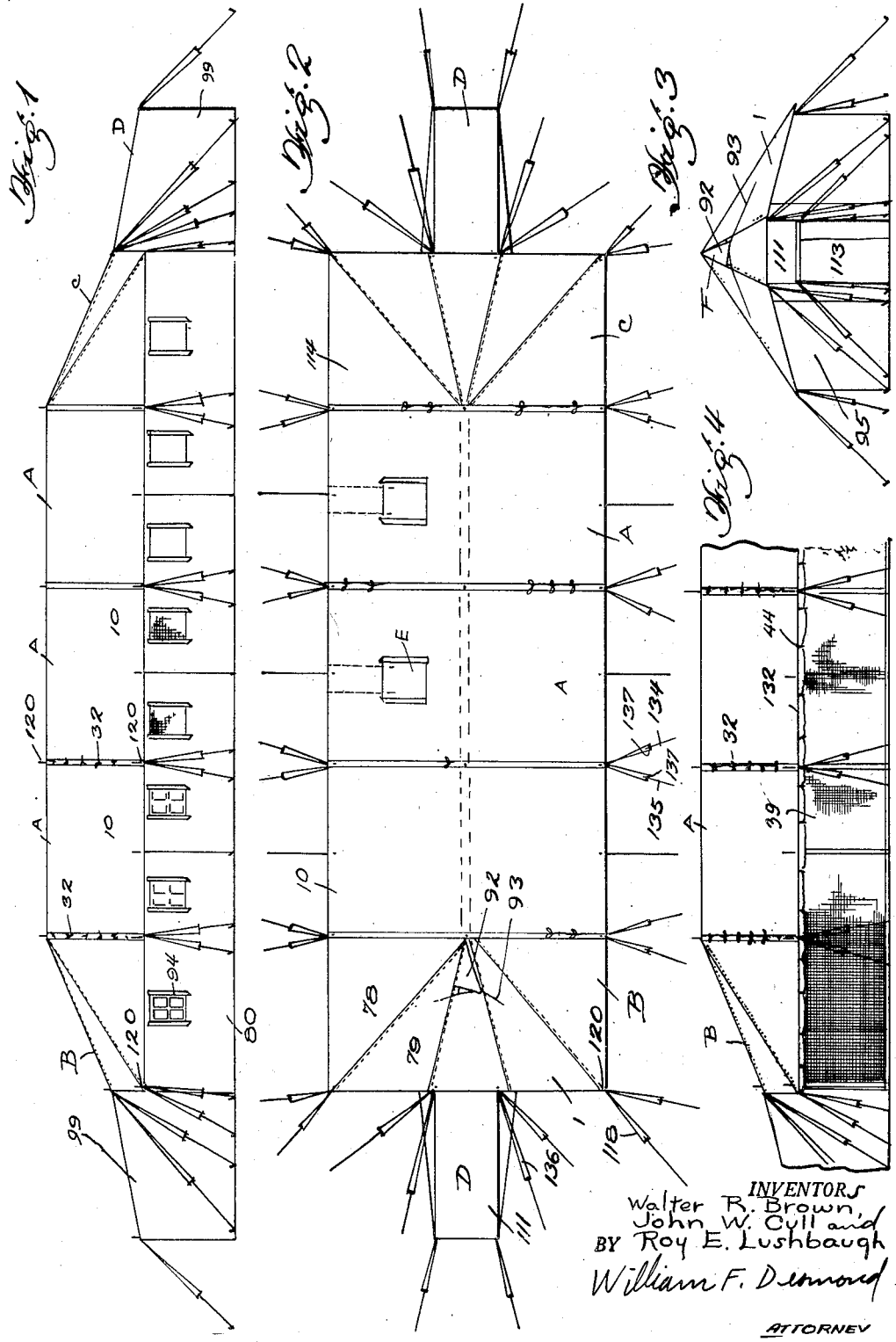

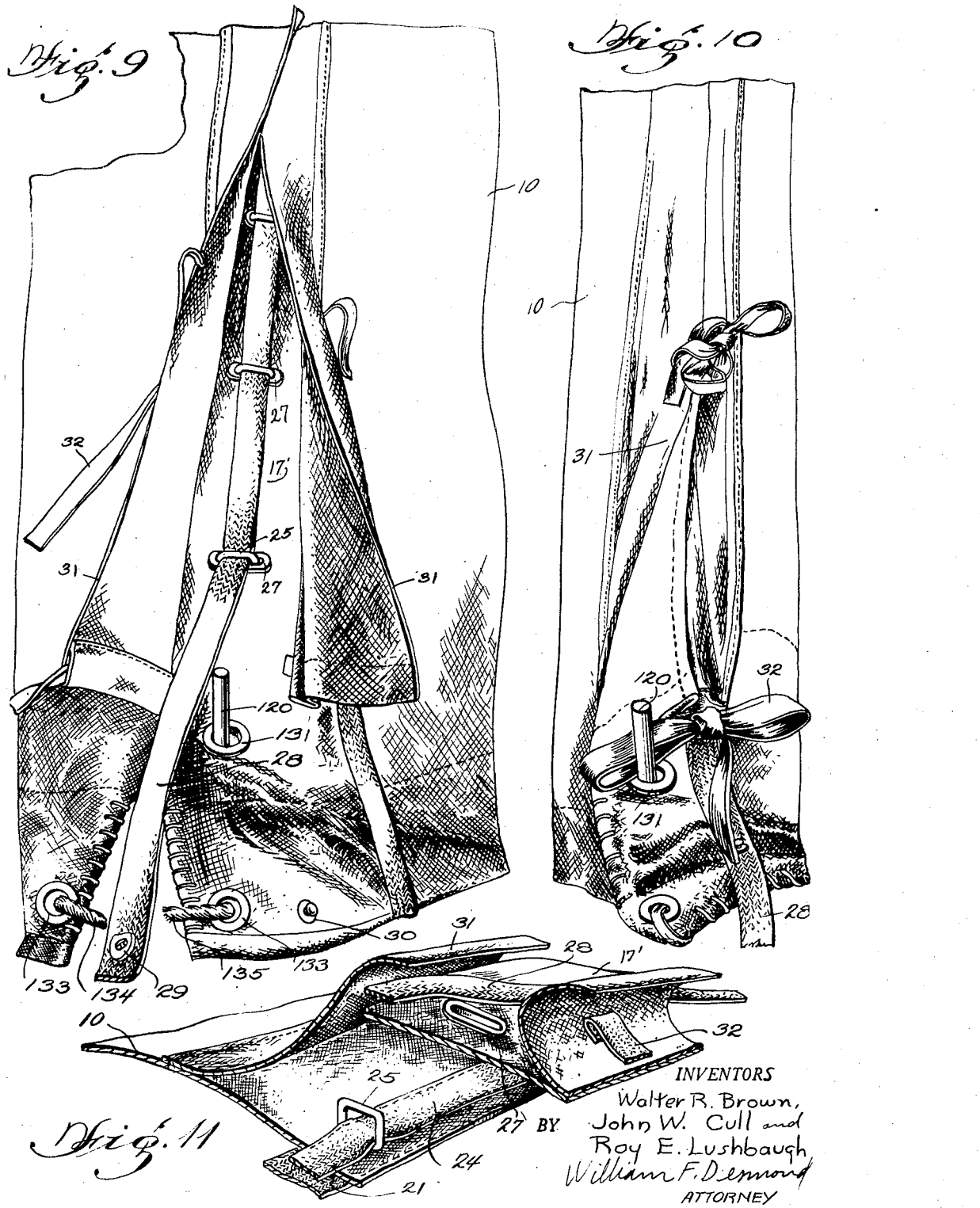

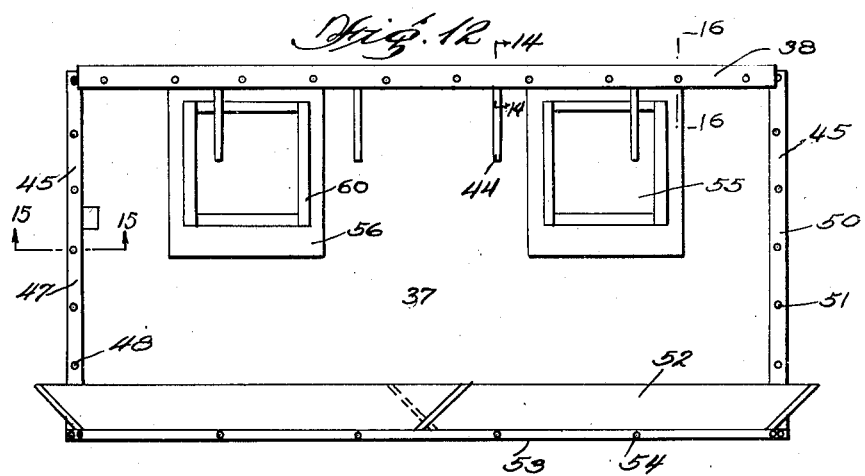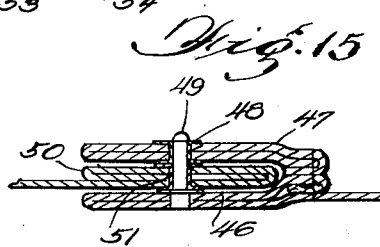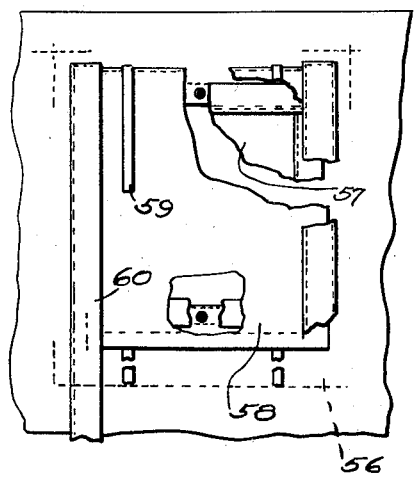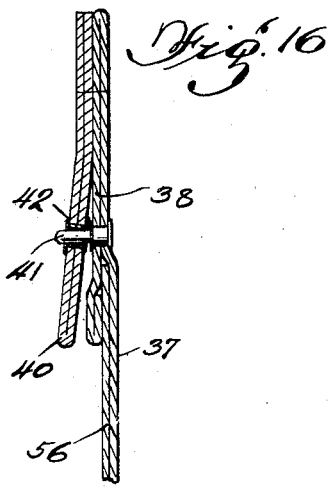

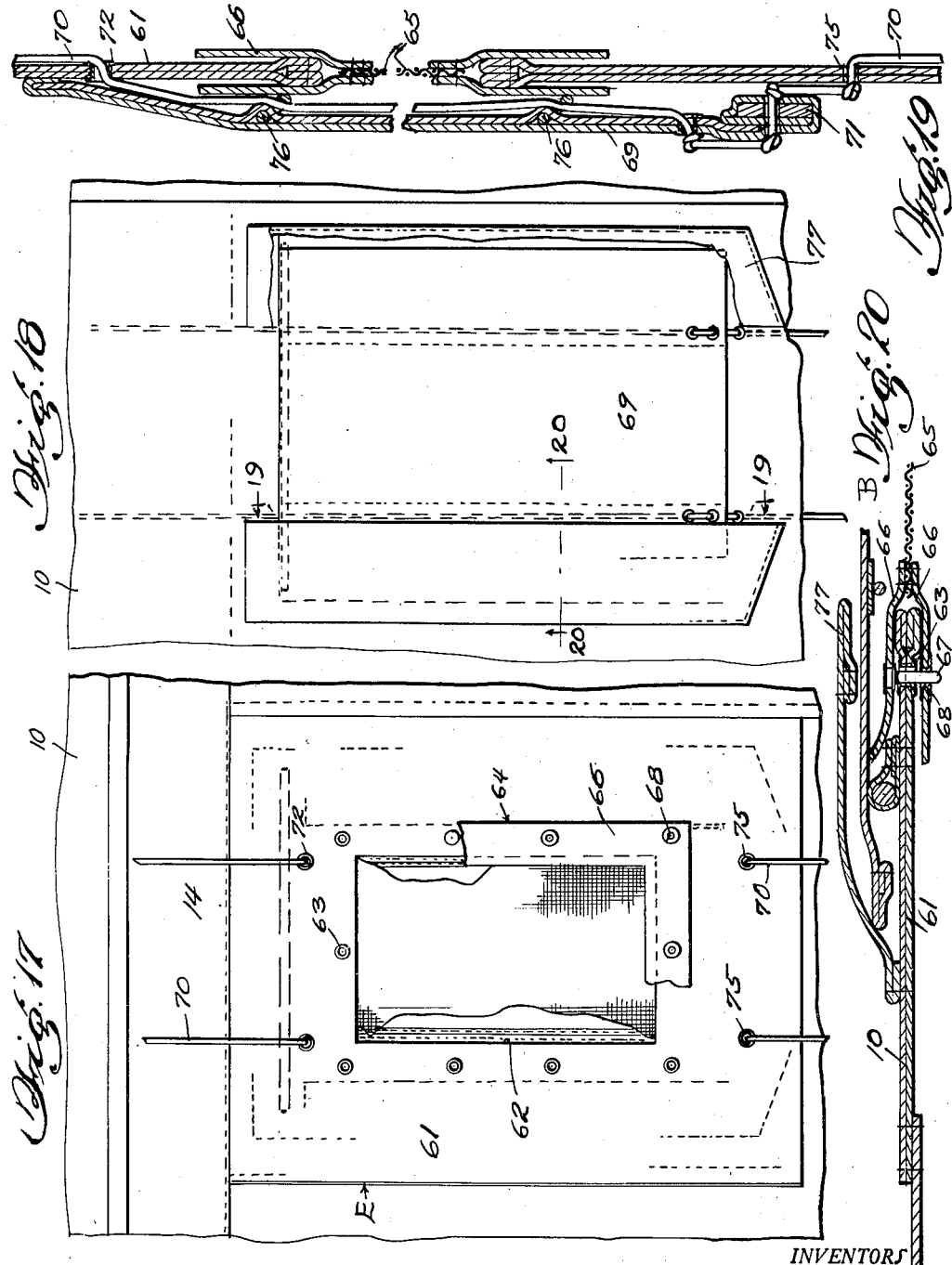

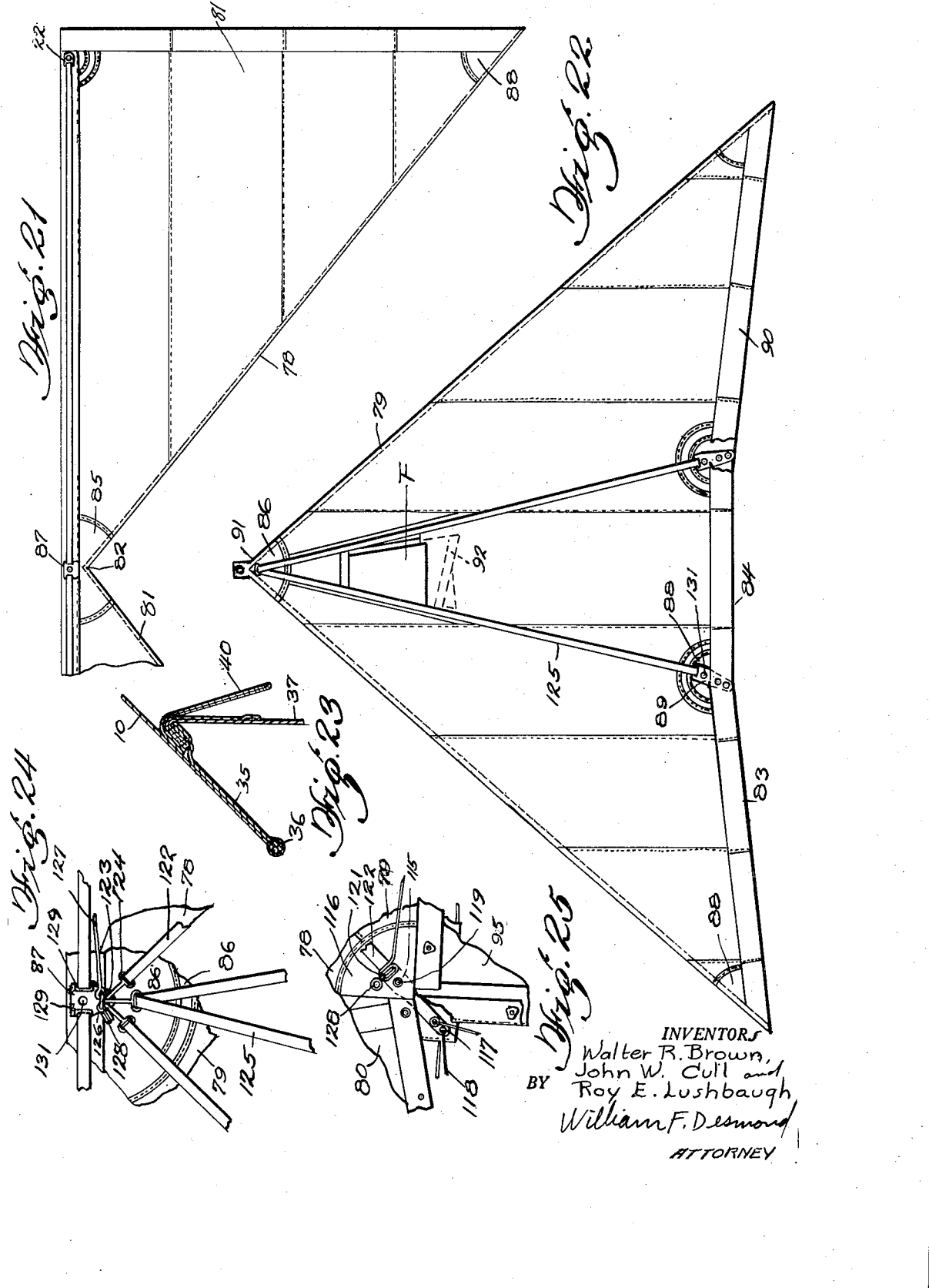

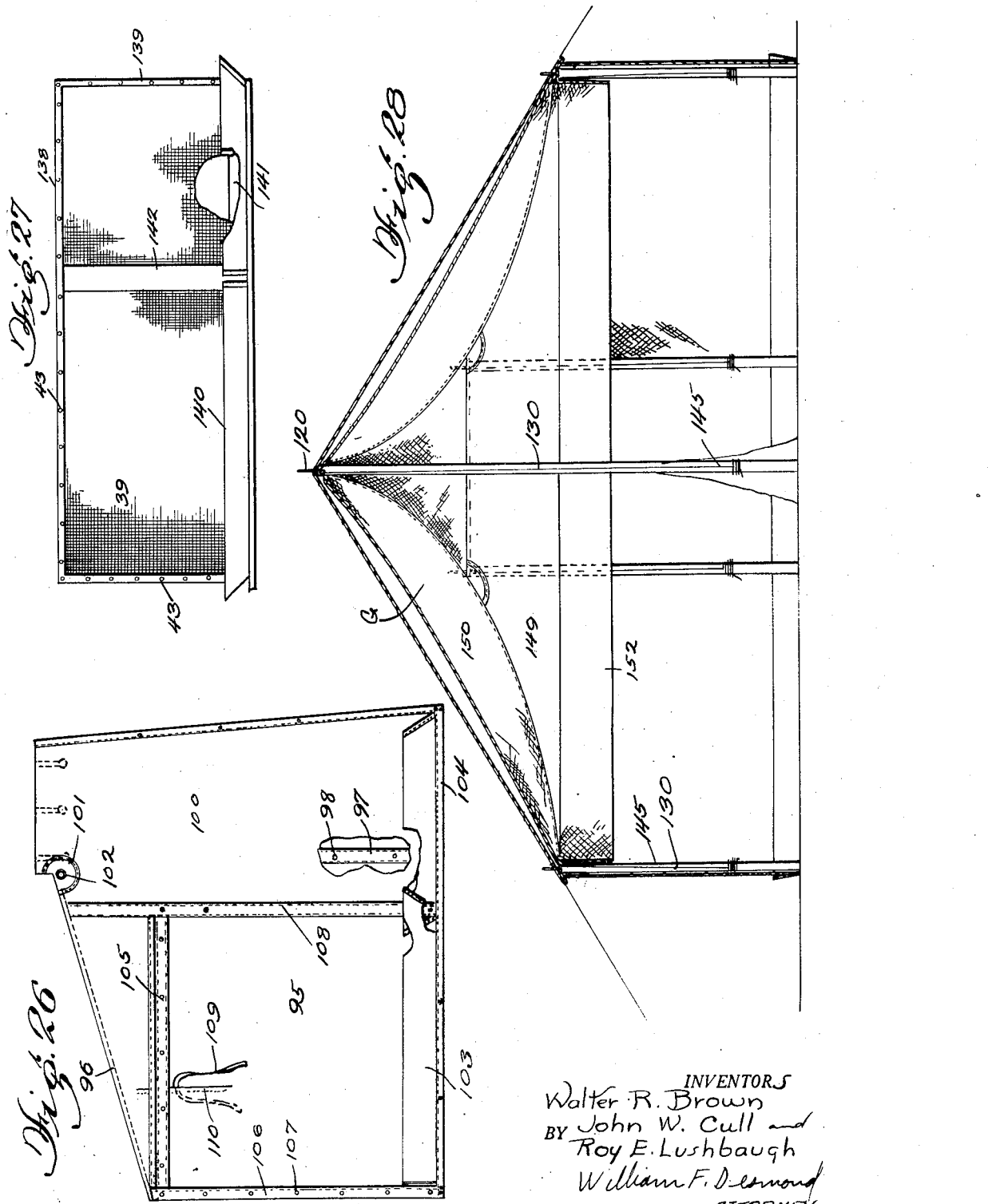

Jan. 10, 1950 W. R. BROWN ET AL 2,493,749
SECTIONAL HOSPITAL TENT
Filed Aug. 11, 1945 8 Sheets-Sheet 8
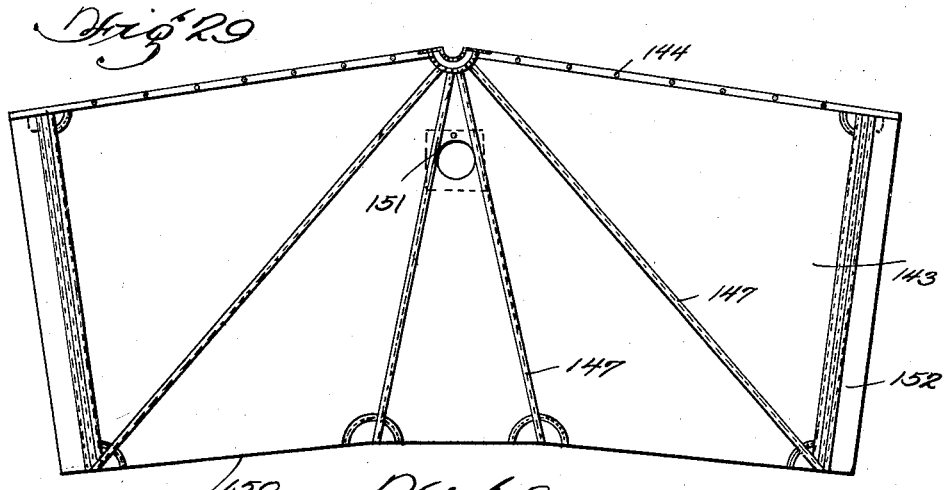
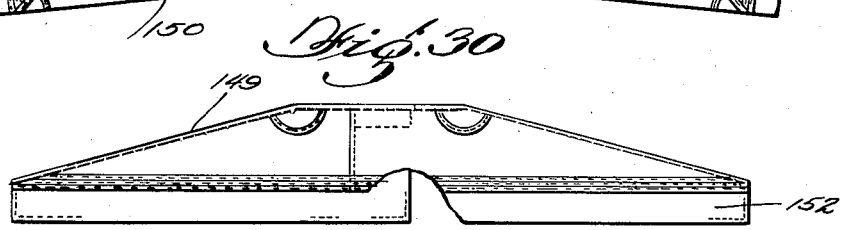
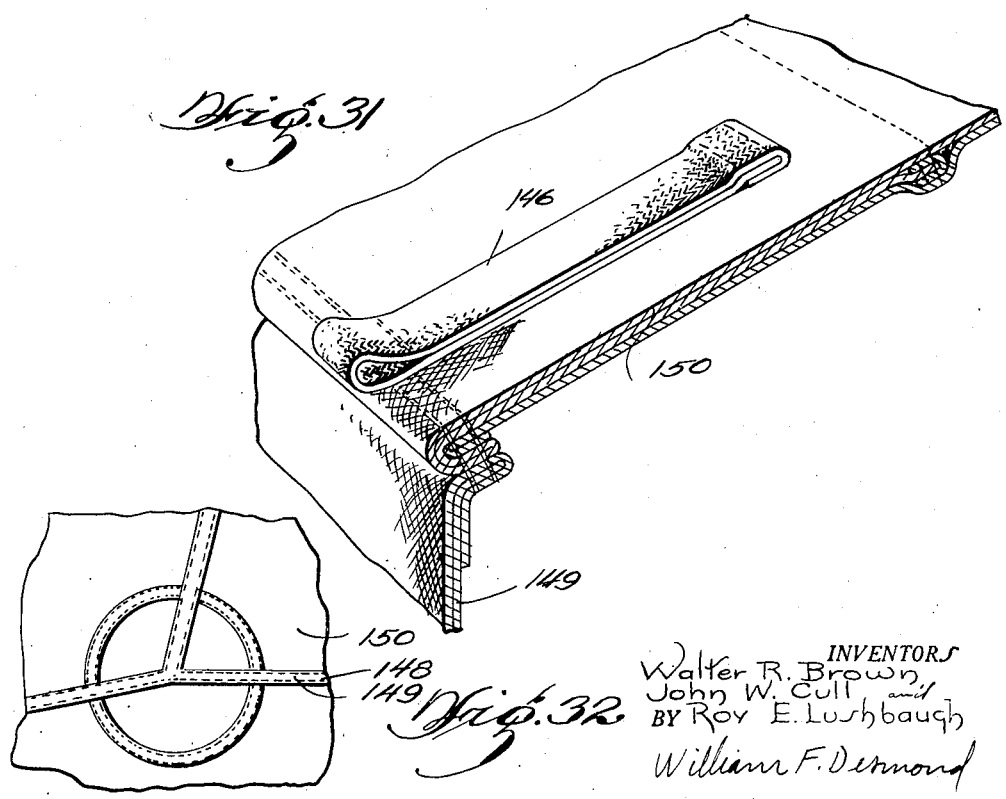
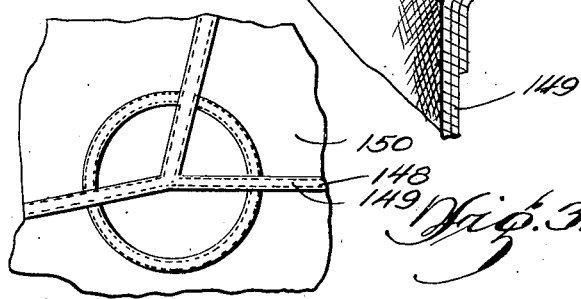
INVENTORS
Walter R. Brown,
John W. Cull, and
BY Roy E. Lushbaugh
William F. Dermond
ATTORNEY Patented Jan. 10, 1950

2,493,749

UNITED STATES PATENT OFFICE 2,493,749

SECTIONAL HOSPITAL TENT

Walter R. Brown, United States Army, Louisville, Ky., and Roy E. Lushbaugh, New Albany, and John W. Cull, Mooresville, Ind.

Application August 11, 1945, Serial No. 610,369

7 Claims. (Cl. 135—1)

(Granted under the act of March 3, 1883, as amended April 30, 1928; 370 O. G. 757)

The invention described herein, if patented, may be manufactured and used by or for the Government for governmental purposes, without the payment to us of any royalty thereon.

The invention relates to a sectional tent having features which make it especially suitable for use as an army hospital tent.

It is an object of the invention to provide a sectional tent comprising two end sections and one or more center sections, the number of center sections employed in the erection of a particular tent depending on the size of tent required in a given situation.

It is a further object of the invention to provide a sectional tent having a novel support and reinforcing means combined with means for securing adjacent sections together.

It is a further object of the invention to provide a tent having a configuration especially suited to receive a vestibule which is adapted to prevent the entry of insects and to provide blackout facilities.

It is a further object of the invention to provide a hospital tent having a double roof for insulating purposes, the double roof being provided by the use of a liner instead of the conventional fly.

It is a further object of the invention to provide novel means for securing the adjacent sections of the tent together and for preventing entrance of rain or insects.

Further objects of the invention will be apparent from a consideration of the following description taken in connection with the accompanying drawings in which:

Fig. 1 is a side elevation of the erected tent;

Fig. 2 is a plan view of the erected tent;

Fig. 3 is an end elevation of the tent;

Fig. 4 is a side elevation of a portion of the tent showing the side wall rolled to expose the screen;

Fig. 5 is a plan view of the inner side of a portion of the roof of a center section, showing a part of the adjoining roof section;

Fig. 6 is a sectional view on a larger scale on the line 6—6 of Fig. 5 revolved through 180°;

Fig. 7 is a sectional view on a larger scale on the line 7—7 of Fig. 5;

Fig. 8 is a sectional view on a larger scale on the line 8—8 of Fig. 5 revolved through 180°;

Figs. 9, 10 and 11 are perspective views on an enlarged scale of the joint between two adjacent roof sections from the outside;

Fig. 12 is an elevational view of the inner side of a detached side wall of a center section.

Fig. 13 is a detail view of a window;

Fig. 14 is a sectional view on the line 14—14 of Fig. 12;

Fig. 15 is a sectional view of the joint between two side wall sections, taken on line 15—15 of Fig. 12;

Fig. 16 is a sectional view on the line 16—16 of Fig. 12 and showing the screen-retaining strip in position;

Fig. 17 is an enlarged plan view of the ventilator viewed from the inside;

Fig. 18 is an enlarged plan view of the ventilator from the outside;

Fig. 19 is a sectional view on the line 19—19 of Fig. 18;

Fig. 20 is a sectional view on the line 20—20 of Fig. 18;

Figs. 21 and 22 are plan views of the inner side of the two pieces of the roof of the end section;

Fig. 23 is a fragmentary sectional view of the roof and side wall of a section seamed together;

Fig. 24 is an enlarged plan view of an end ridge plate;

Fig. 25 is an enlarged plan view of the under side of a corner of an end section;

Fig. 26 is a view of an end wall of an end section of the tent, viewed from the inside;

Fig. 27 is a view of a screen panel;

Fig. 28 is a sectional view transversely of the tent showing the liner in place;

Figs. 29 and 30 are views from the inside of the two pieces forming the end liner section;

Fig. 31 is a detailed perspective view of a hanger loop for the liner; and

Fig. 32 is a detailed plan view of a portion of the liner pieces of Figs. 29 and 30 joined together.

The tent comprises one or more central sections A, depending on the size of tent required, and left and right end sections B and C. The end sections are provided each with a vestibule D and are similar except for having their corresponding parts reversed to form opposing ends for the tent.

The central sections are identical in construction and hence only one of them will be described in particular. Each section A comprises a roof-forming sheet 10 made up of any desired number of strips of duck 11 extending from one eave portion to the opposite eave, the strips being secured together usually by a double stitched flat seam 12, and two side wall sections 37. As provided in one example, the roof section is approximately 11' 10½" in its transverse extent and 21' 8" from eave to eave. As seen in Fig. 5, the ridge line of the roof section 10 is reinforced between the centers of the opposite long edges by a ridge band 14 approximately 13¾" wide and a strip of webbing 15 which is ordinarily 1½" wide. The sides of the ridge band 14 are stitched to the inside of the roof section and the ends of the band are secured underneath reinforcing patches 16 and 16' and the facing strips 17 and 17' at the side edges of the roof section. Middle section ridge plates 19 and 19', shown more particularly in Figure 5, are secured on the reinforcing patches 16 and 16' at opposite ends of the ridge band 14, and the ends of the webbing 15 are anchored in grommets in the ridge plates. The ends of the webbing 15 are turned back approximately 10" after passing through the grommets 18 and stitched with a plurality of rows of stitching 20. The outer rows of stitching are continued along the edges of the webbing 15 through the tent fabric and the ridge band 14.

Along each side of the roof section 10 means is provided for supporting the section on the tent poles and for securing it either to the roof of another center section A or to the roof of an end section B or C. The right side of the central section roof sheet, as viewed in Figure 5, is finished in the following manner:

A facing 17 which is about 4¾" wide is secured to the inside edge of the roof sheet 10, preferably by stitching along opposite turned under edges, and on the inner side a piece of 1½" webbing 21 is stitched on the facing 17 slightly to the outside of the center of the facing on each side of the ridge plate 19. The end of each piece of webbing adjacent the ridge line is secured to a grommet in the ridge plate 19, and the other end to the eave plate 22 mounted on double reinforcing patches 23 at the lower ends of the facing. On the outer side a strip of 1" webbing 24 is stitched centrally of the webbing strip 21 from points slightly within the extremities of the strip 21, and at 10" intervals strap loops 25 are placed under this webbing and secured by transverse stitching 26.

The left side of the roof sheet as viewed in Figure 5 is finished with a facing 17' similar to the right side, having corresponding reinforcing patches 16' and ridge plate 19' and a corresponding eave plate (not shown). Oblong grommets 27 are spaced at 10" intervals along the facing strip 17', and above the upper grommet on each side of the ridge plate one end of a lacing strip 28 of 1" webbing is secured on the outside of the roof sheet. The lacing strip 28 is free of the tent sheet 10 throughout the remainder of its extent, and has a snap fastener socket 29 for securing its lower end to the stud 30 on the roof sheet 10 near the eaves.

As seen in Figs. 9-11, each outside edge of the roof section 10 opposite the inner edge of the facing 17 is provided with a water flap 31 to cover the joint between adjacent sections, each flap 31 being provided with tie strips 32 for securing it to the flap of an adjacent roof section.

In addition to the eave plates 22 at the side edges of the roof section, a central eave plate 33 is provided mounted on a double reinforcing patch 34 of approximately semi-circular shape. The eave edges are finished with a turned 5½" hem 35, reinforced with a cotton rope 36 at the outer edge of the hem (see Figure 23).

The side walls 37 of the center section A are stitched to the roof sheet 10 along the inner edge of the eave hem 35, as shown in Fig. 23. The side walls 37 are slightly narrower in width than the roof 10 and are somewhat over 6' in height. Side walls 37 are made of vertical strips of duck in the same fashion as the roof sheet 10 and are finished at the top inside edge with a hem 38, as seen in Fig. 12, for finishing and reinforcing the edge. Means for receiving a screen panel 39 consists of a depending fold of cloth 40 (Fig. 16) of substantially the same width as the turned-down hem 38 at the top of the panel, which is stitched into the seam between the roof 10 and side wall 37. Snap fastener elements are mounted on the hem 38 and on the flap 40 so that the stud 41 mounted on the hem will enter corresponding socket 42 on the flap. The screen panel 39 (Figs. 4 and 27) is provided with matching grommets 43, and when the flap 40 is raised the screen panel 39 is suspended from the elongated studs 41 on the side wall hem 38. When the flap 40 is snapped down over the panel 39, an insect-proof joint is formed. The fabric side wall can be rolled up and secured by wall ties 44 of webbing which are secured in the roof seam at intervals in pairs on opposite sides of the wall (Figs. 4, 12, and 14).

The side edges 45 of the side wall 37 are finished on one side with a hem 46 (Fig. 15) and a flap or wall retainer 47 provided with cooperating snap fastener elements 48 and 49 to receive an edge of an adjoining section between them, as in the case of the screen panel 39 along the eave edge of the side wall. The opposite edge of the wall is provided with a plain hem 50 having grommets 51 to be received on the fastener elements 49 of an adjacent wall section.

The bottom edge of the tent side wall 37 is provided with sod cloth extensions 52 bound into the hem 53. The hem carries a series of grommets 54 to receive foot stops (not shown) for securing the bottom of the tent to stakes or other supports. The side walls 37 of the central sections A are provided each with two windows 55. The window openings are cut in the walls within reinforcing patches 56, and have a removable sash, the sash comprising a transparent plastic panel 57 (Fig. 13) having double wall extensions provided with snap fastener elements which are adapted to receive grommets in the surrounding tent wall, as shown more particularly in connection with the ventilator sash subsequently described. The windows have covering flaps 58 with ties 59 and window flap retainers 60.

As seen in Figs. 2 and 5, each central roof section is provided with a ventilator E on one side of the ridge. A section of the roof has a reinforcing patch 61, which is 35" long and the same width as the strips of duck 11, secured by being sewed under the ridge band 14, in the joining seams 12 of the strips, and across the bottom of the patch. A central opening 62 (Fig. 17), which is 12" x 18", has grommets 63 spaced around its edges. A sash 64 having a perforated transparent plastic insect screen 65 and a double peripheral flap 66 is secured in the opening 62 by means of snap fastener elements 67 and 68 mounted in opposed relation on the inner faces of the flaps 66 and extending through the grommets 63 in the tent roof. The sash 64 is covered by a ventilator flap 69 stitched to the roof panel 11 above the opening 62 and operated by draw lines 70 secured to the stiffener 71 at the free end of the flap 69. The lines 70 for raising the ventilator flap 69 extend through eyelets 72 and through D-rings 73 secured under the ridge webbing to a bullseye 74 on the center eave plate 33 on the opposite side of the roof (not shown). The lines 70 for lowering the ventilator flap 69 extend through eyelets 75 to a bullseye 74 on the center eave plate 33 at the same side of the roof 10 (see Fig. 5.) The draw lines 70 are guided through D-rings 76 on the underside of the flap 69, and the edges of the flap 69 are guided and protected by the ventilator flap retainers 77.

Each end section B or C of the tent consists of roof elements 78 and 79 of the configuration shown in Figures 2, 21 and 22 of the drawings, two side wall units 80, and two end wall units 95, as shown in Figure 26. The inner roof sheet 78 which lies adjacent the middle section A is formed with two wings 81 which are approximately the same width as the side wall units 80 at the eaves (Fig. 1), and are joined by a narrow bridge 82. The sheet 78 has a straight edge adjacent the middle section roof 10, this edge having fastening means of the same type as the right edge of the roof section 10 of the middle section A. The opposite side is V-shaped, the point of the V extending inwardly to a point opposite the center of the straight edge and forming the bridge 82. The other roof section 79 is substantially triangular, the edge 83 forming the eave of the end tent section B being slightly drawn in at the center 84 for the purpose of forming a flat joint with the vestibule section D. The inner and outer roof sections 78 and 79 of the end assembly B are seamed together with appropriate reinforcement. The center portions of both sections are provided with reinforcing means 85 and 86, forming when assembled a flat semi-circular patch, and an end ridge plate 87 is secured to the center of the patch 85 on the facing of the straight edge of the piece 78. The ridge plate 87 is shown broken away in Fig. 21, but appears on a larger scale and in complete form in Fig. 24. An additional reinforcing patch 86' may be provided at the apex of the roof section 79 as shown in Fig. 24. Reinforcing patches 88 are provided at the corners of the end section and at the vestibule, and eave plates 89 are mounted on the vestibule patches. The outer corners of the roof sections 78 and 79 are shown somewhat diagrammatically in Figures 21 and 22, but in detail as assembled with the side and end walls in Figure 25. The entire eave line is provided with a hem 90 corresponding to the hem of the center section eaves.

The outer roof section 79 is provided with a ventilator F lying within the angle formed by lines extending from the apex 91 of the triangle to the vestibule eave plates 89. The screen panel of the ventilator is like that of the middle section ventilators E, but the covering means consists of a pair of overlapping flaps 92 with direct exterior draw lines 93 (see Figure 3).

The side walls 80 of the left end section B, as seen in Figure 1, are provided with double flaps and snap fasteners on one edge (not shown), that is, the corner edge, and with a hem with grommets on the other edge. The side walls 80 are also provided with a single window 94 and with a sod cloth. Since these features are in all respects similar to the corresponding features of the center section side walls, a detailed description is not given.

The end walls 95 of the end tent section B are seamed to the roof section 79 along the eaves at the hem 90, the upper edge sloping upwardly at 96 (Fig. 26) to follow the roof line as it rises toward the vestibule eave plate 89. At this point a vestibule securing flap 97 (Fig. 26) is provided having grommets 98, and the vestibule wall 99 (see Figure 1) is assembled with the side end wall 95 by a double flap carrying fastener elements (not shown) as in the side wall joints. Each wall 95 carries an extending portion 100 to form a pair of inner doors. A reinforcing patch 101 and grommet 102 are provided at the junction of the end wall 95 and the door flap 100 and the end wall and the flap are provided with sod cloths 103 and 104. The screen wall retainer 105 extends horizontally across the end wall, instead of following the eave line, and the corner edge is provided with a hem 106 and grommets 107. A joint is provided at 108 having the usual grommeted hem inserted between a hem and flap carrying snap fastener elements, so that the part of the side wall below the screen retainer 105 can be rolled up. The tie lines 109 are stitched into the seam 110. The vestibule D has a flat sloping roof 111, the upper edge of which is secured to the underside of the eave hem 90 by any suitable means. Side walls 99 having sod cloths (not shown) and doors 113 (Fig. 3) at the outer end complete the vestibule structure.

The end section C at the right end of the tent is made in the same way as the section B, except for the reversal of parts and the wall joining means at the inner end of this section, as viewed in Figure 1, being provided with fasteners of a character opposite to those of the left hand end, that is, with a double flap and snap fasteners instead of a hem with grommets, and the roof section 114 with grommets instead of loops as at the left side of the roof 10, as shown in Figure 5.

The eave plates 22 and 33 on the center and end sections are generally the same as those of the end section, the plate 115, shown in Figure 25, being typical. This plate consists of a metal member secured to the reinforcing patch 116 formed by the patches 88 at the corner roof sections 78 and 79 and provided with grommets 117 at its outer end to receive the tent line 118, these grommets also extending through the tent fabric. A grommet 119 is placed within the body portion of the plate to receive the pin 120 at the top of the respective supporting pole, and an opening with a grommet 121 is provided to receive reinforcing and supporting webbing 122 extending to the end ridge plate 87. The end ridge plates 87 have grommets 123 to receive the snap hooks 124 attached to the ends of the roof reinforcing webbing 122 and 125 (Figs. 22 and 23), and all ridge plates and eave plates at other corners have oblong grommets to receive the webbing strips which lie along the edges of the roof sheets 10 and 78. Eyes 126 may also be mounted on the plates to receive jumper lines and bullseyes 74 or 128 through which the ventilator lines 70 and liner raising lines, to be described subsequently, extend. The ridge and eave plates are permanently secured to the fabric of the tent, both by the grommets which necessarily pass through both, as those receiving the poles and eave lines, and by stitching 129 passing through apertures in the plates and through the adjacent fabric and reinforcements.

As seen in Fig. 28, the supporting structure of the tent comprises a series of poles 130, each having a projecting pin 120 at the top which extends through a grommet 102, 119 or 131 of one or more of the ridge or eave plates of the tent sections A, B or C. The end ridge plates 19 and 19' of each center section engage a pole pin 120 by means of a grommet 131 therein, as do the eave plate grommets 119 of each section. The center sections A are provided with support poles 130 at the center of the eave side, as well as the corner of each section. The common supporting structure of two adjacent center sections A thus consists of a pole 130 having the end eave ridge plates 22 of each section mounted thereon, while the corner grommets 133 of the eave sections have the eave lines 134 and 135 secured in them and crossed to extend in slightly angular relation, which tends to pull the adjacent sections together. The corners between the center and end sections are obviously similar. The corner and vestibule eave plates 115 and 89 have guy lines 118 and 136 extending therefrom in diverging relation to furnish a secure support. In some cases the eave plate may be omitted on one member, as in the vestibule corner adjacent the end of the tent.

In assembling the tent the side of one roof section 19 or 78 having the elongated grommets 27 is placed over the side of the adjacent section in overlapping relation with the strap loops 25 projecting through the grommets 27. The narrower lacing strap 28 is then threaded through the series of strap loops 25 from ridge to eave, and its lower ends secured by the snap fastener 29, 30. The water flaps 31 are then closed over the joint and secured by the tying tapes 32. The tent can then be raised on the poles 130 and the eave lines secured, guy line slips 137 being employed according to the usual practice.

The strips of reinforcing webbing 122 and 125 provided between the ridge and eave plates from the ridge plate of the end roof section to the corner of the end section along the seam lines between the inner and outer end roof sections 78 and 79 and also from the end ridge plate to the eave plates 89 at the corners of the vestibule D reinforce and shape the roof of the end section, forming a somewhat flattened ridge meeting the flat roof 111 of the vestibule and allowing for an increase in the height of the vestibule at its inner end.

The screen panels 39 (Figure 27) which may be secured inside the side walls of the tent are attached within the depending flaps 40 below the side eaves and below the flaps 105 at the ends, as previously described. The tent walls are rolled up and secured with the ties 44 and 109 at such times as weather conditions require the use of the screen panels. A single screen panel 39 is provided for each side wall of the center sections A of the tent, but the side and end wall of the end sections are formed of a continuous screen panel, this being the panel illustrated in Figure 27.

Each panel 39 consists preferably of a perforated plastic sheet of suitable color, usually olive drab, and with varying degrees of light transmitting capacity. The panels 39 are bound on their edges with cotton webbing 138 and provided with grommets 43 on the top and one side edge and with double flaps 139 with snap fasteners on the other side edge for securing them to the wall flaps and to one another. At the bottom a sod cloth 140, with binding and grommets to receive foot stops, is provided as in the side walls of the tent. A splash curtain 141 is also secured in the binding at the outside of the lower edge of the panels and extends upwardly as far as desired to prevent entrance of water splashed from the eave runoff. Where the panels for the end section extend around the corner pole a vertical chafing strip 142 of the fabric is applied to the panel 39.

Corresponding to each section of the tent is an inner lining member G (Figs. 28 and 29) of lighter weight material having substantially the same configuration as the roof of the section itself. Figure 29 shows the liner section 143 corresponding to the roof of the end section B. The adjacent liner sections are secured together by snap fasteners 144 placed along hemmed edges. The liner sections are provided with cutouts forming apertures of a size to slide freely up and down the center supporting poles 130 of the tent and lines 145 are attached to the loops 146 at the reinforced edge of each cutout and at the reinforced corners where the sections are stitched together. These lines 145 are passed upwardly through the bullseyes 74 and 128 of the ridge or eave plate adjacent the corresponding portion and the ends returned through the apertures surrounding the center poles or between the liner and side walls of the tent and secured to the respective poles 130. The completely assembled liner G can thus be raised and suspended beneath the tent roof by means of these lines. The end section liner is roughly shaped to the roof by webbing supports 147 and seams 148 as between the sections 149 and 150.

The liner may be secured at any desired distance below the tent roof, or if raised to the limit of its supporting means will hang somewhat loosely below the tent forming an air space for insulation. It has a further advantage of being constructed of lighter weight material than the conventional fly, of being less subject to damage from storms and of preventing the dropping of portions of the filler and water proofing material from the roof onto the hospital beds below.

Stove pipe openings 151 are provided where desired in both the tent and the liner, and a depending portion 152 is provided on all edges of the liner.

The material of the tent is suitably treated with fireproofing, mildew and waterproofing compositions or chemicals, but the lighter weight material of the liner need not be heavily treated, especially with waterproofing compound.

While we have described the preferred embodiment of our invention in considerable detail, even including dimensions, it is understood that changes falling within the scope of the appended claims are contemplated.

Having thus described our invention, what we claim and desire to secure by Letters Patent is:

1. A sectional tent having fabric sections and combined supporting and joining means comprising flexible webs having projecting loops thereon, certain edges of said sections having eyelets received on said loops, and retaining means threaded in said loops to prevent disengagement of the sections.

2. A sectional tent having a plurality of roof sections provided with apertures and means for supporting the roof and securing adjacent sections together, said means comprising webbing extending along certain of the edges of said sections and engaging the main supports of the tent, said webbing having fasteners engaging the apertures in the other edge of said roof sections, and flaps covering said apertures to prevent the entry of rain.

3. A sectional tent having supporting poles at its ridge and eaves, and having plates secured to the tent fabric at the points engaged by the poles and flexible means extending from the plates at the ridge to the plates at the eaves and lying beneath the fabric for supporting the same.

4. A tent as defined in claim 3, certain of said flexible supports carrying means for securing the adjacent tent sections together.

5. A hospital tent comprising fabric outer wall and roof sections, supporting poles, and reinforcing means for said roof sections, said means comprising rigid plates secured to the fabric and engaging said poles and flexible webbing extending along the edges of certain sections from pole to pole, said webbing being secured to said plates and to said fabric.

6. A hospital tent comprising one or more center sections and a pair of end sections, each section having roof and side wall sections, and a liner comprising corresponding sections having roof and short depending sections, said tent sections having rigid reinforcing plates adapted to engage supporting poles and said liner sections being adjustably supported from said plates.

7. A sectional tent comprising a plurality of identical center sections and a pair of matching end sections, each section being composed of roof and wall panels, means for securing the roof panels together and supporting the same, and interleaved connections between the edges of adjacent sidewall panels whereby the connections are rendered insect-proof.

WALTER R. BROWN.
ROY E. LUSHBAUGH.
JOHN W. CULL.

REFERENCES CITED

The following references are of record in the file of this patent:

UNITED STATES PATENTS

| Number | Name | Date |
|---|---|---|
| 426,659 | Carpenter | Apr. 29, 1890 |
| 844,632 | Thompson | Feb. 19, 1907 |
| 998,915 | McMillin | July 25, 1911 |
| 1,045,132 | Dorsey | Nov. 26, 1912 |
| 1,061,547 | Kennedy | May 13, 1913 |
| 1,377,788 | Pennewell | May 10, 1921 |
| 1,494,050 | Wittmann | May 13, 1924 |
| 1,730,565 | Flintjer | Oct. 8, 1929 |
| 1,833,096 | Smith | Nov. 24, 1931 |
| 1,856,658 | Rummler | May 3, 1932 |
| 2,345,377 | Bowen | Mar. 28, 1944 |

FOREIGN PATENTS

| Number | Country | Date |
|---|---|---|
| 54,613 | Norway | Nov. 12, 1934 |